(12) United States Patent
Mullard et al.

(10) Patent No.: US 9,273,866 B2
(45) Date of Patent: Mar. 1, 2016

(54) GEOTHERMAL ASSISTED POWER GENERATION

(75) Inventors: Brad William Mullard, Rutherford (AU); Behdad Moghtaderi, Callaghan (AU)

(73) Assignee: NEWCASTLE INNOVATION LIMITED, Callaghan NSW (AU)

( * ) Notice: Subject to any disclaimer, the term of this patent is extended or adjusted under 35 U.S.C. 154(b) by 215 days.

(21) Appl. No.: 14/124,250

(22) PCT Filed: Jun. 26, 2012

(86) PCT No.: PCT/AU2012/000745
§ 371 (c)(1),
(2), (4) Date: Dec. 5, 2013

(87) PCT Pub. No.: WO2013/000013
PCT Pub. Date: Jan. 3, 2013

(65) Prior Publication Data
US 2014/0116045 A1      May 1, 2014

(30) Foreign Application Priority Data
Jun. 27, 2011  (AU) ................. 2011902528

(51) Int. Cl.
*F03G 7/00* (2006.01)
*F01K 19/10* (2006.01)
*F22D 1/00* (2006.01)
*F01K 13/00* (2006.01)
*F01K 27/00* (2006.01)
(Continued)

(52) U.S. Cl.
CPC ............... *F22D 1/003* (2013.01); *F01K 13/00* (2013.01); *F01K 27/00* (2013.01); *F03G 6/065* (2013.01); *F03G 6/067* (2013.01); *F03G 7/04* (2013.01); *Y02E 10/10* (2013.01); *Y02E 10/46* (2013.01)

(58) Field of Classification Search
CPC ......... F22D 1/003; F03G 6/067; F03G 6/065; F03G 7/04; F01K 27/00; F01K 13/00; Y02E 10/10; Y02E 10/46
USPC ............. 60/641.2–641.5, 653, 654, 659, 678, 60/676, 641.8–641.15
See application file for complete search history.

(56) References Cited

U.S. PATENT DOCUMENTS

| | | |
|---|---|---|
| 3,276,203 A | 10/1966 | Squires |
| 5,311,741 A | 5/1994 | Blaize |
| 5,685,362 A * | 11/1997 | Brown ............................ 165/45 |

(Continued)

FOREIGN PATENT DOCUMENTS

DE     102004048932 A1    4/2006

OTHER PUBLICATIONS

ISR for PCT/AU2012/000745 mailed on Aug. 8, 2012.
(Continued)

*Primary Examiner* — Hoang Nguyen
(74) *Attorney, Agent, or Firm* — Ladas & Parry, LLP

(57) ABSTRACT

In a coal fired power plant (17) incorporating a feed-water heater (10), energy is provided to the feed-water heater by pumping geothermal hot water through supply and return pipes (15, 16) from a geothermal reservoir (14) located beneath an adjacent coal seam (19). The coal seam acts as an insulating layer, increasing the temperature of the geothermal reservoir (14). Solar heat collectors (21) and (25) can also be provided to boost the temperature of the geothermal hot water and/or the feed water.

6 Claims, 4 Drawing Sheets

(51) Int. Cl.
*F03G 6/06* (2006.01)
*F03G 7/04* (2006.01)

(56) References Cited

U.S. PATENT DOCUMENTS 7,178,337 B2    2/2007   Pflanz
8,169,101 B2 *  5/2012   Hinders et al. .................. 290/52
8,549,857 B2 * 10/2013   Papile .......................... 60/641.2
8,708,046 B2 *  4/2014   Montgomery et al. ....... 166/302
2009/0320473 A1 12/2009  Krieger et al.
2010/0089060 A1  4/2010  Ferguson et al.

OTHER PUBLICATIONS

International Preliminary Report on Patentability (Chapter II of the PCT) for PCT/AU2012/000745 completed on Jun. 11, 2013.
EPO Search Report From Corresponding EPO Application No. 12805363.4 Mailed on Sep. 10, 2015.

* cited by examiner

GEOTHERMAL ASSISTED POWER GENERATION

CROSS-REFERENCE TO RELATED APPLICATIONS

This application is the U.S. National Stage of International Patent Application No. PCT/AU2012/000745 filed on Jun. 26, 2012, which claims priority to Australian Patent Application No. 2011902528, filed on Jun. 27, 2011 the disclosures of which are hereby incorporated by reference in their entireties.

FIELD OF THE INVENTION

This invention relates to geothermal assisted power generation and has been devised particularly though not solely to improve the operating efficiency of a coal-fired power plant.

BACKGROUND OF THE INVENTION

It is well-known to provide conventional coal-fired power plants in which coal is burnt in a furnace to turn feed-water into steam which is in turn fed to a steam turbine used to drive an electrical generator. Exhaust steam from the turbine is then fed to a condenser where it is cooled and returned to water before being pumped back into the furnace to continue the cycle. The condenser is effective in improving the operating efficiency of the turbine by providing a low pressure environment for the exhaust steam from the turbine.

It is also known to increase the efficiency of such a conventional coal-fired power plant by bleeding partially expanded steam from the turbine to a feed-water heater located between the condenser and the furnace in order to preheat the feed-water into the furnace and improve the operating efficiency. Such arrangements, while generally increasing the overall efficiency of the power plant do reduce the amount of power available from the steam turbine to drive the electrical generator.

SUMMARY OF THE INVENTION

The present invention therefore provides a geothermal assisted coal-fired power plant including a furnace arranged to heat feed-water into steam, a turbine driven by the steam and in turn driving an electrical generator, a condenser arranged to receive exhaust steam from the turbine, cooling and condensing it back to water, and a feed-water heater arranged to reheat water from the condenser before feeding it back to the furnace, wherein the power plant uses coal taken from one or more coal seams in the vicinity of the power plant, and the feed-water heater is provided with energy from a geothermal reservoir located beneath at least one of the coal seams.

The coal seam acts as an insulating heat flow barrier, keeping the temperature of the geothermal reservoir at a higher level than would be the case in the absence of the coal seam.

Preferably, the energy from the geothermal reservoir is provided by pumping geothermally heated water from the reservoir, circulating this geothermal hot water through the feed-water heater, and then returning it to the geothermal reservoir for re-heating.

In some situations, both the coal seam and the geothermal reservoir are located some distance from the power plant with the geothermal hot water re-circulated through insulated supply and return pipelines.

Preferably, the temperature of the geothermal hot water in the supply pipeline is boosted by one or more solar collectors located along the supply pipeline.

In one form of the invention, the temperature of the feed-water is boosted by one or more solar collectors.

BRIEF DESCRIPTION OF THE DRAWINGS

Notwithstanding any other forms that may fall within its scope, one preferred form of the invention will now be described by way of example only, with reference to the accompanying drawings in which.

PREFERRED EMBODIMENTS OF THE INVENTION

Figure 1:
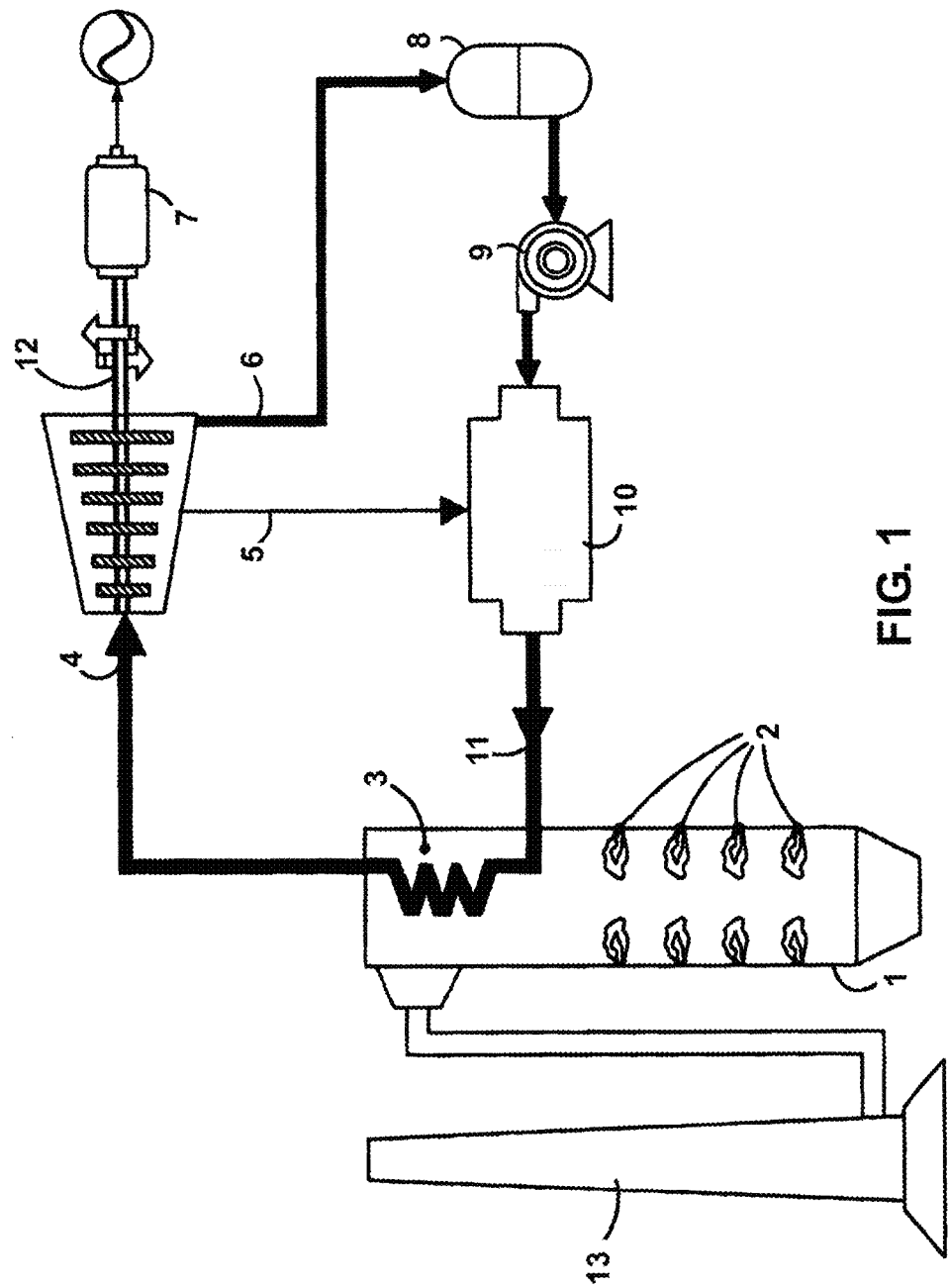
FIG. 1 is a schematic representation of a conventional steam driven Rankine cycle coal-fired power plant.

In a conventional steam-driven Rankine cycle coal-fired power plant, a coal-fired furnace 1 is provided, fuelled by coal, fed to burners 2 within the furnace. The furnace incorporates a boiler section 3 which is used to heat feed-water pumped into the furnace at 11 into high-pressure steam which is fed to a steam turbine at 4. The steam turbine drives a drive shaft 12 which is coupled to an electrical generator 7 to generate electricity.

Exhaust steam leaves the turbine at 6 and is fed to a condenser 8 where it is cooled and returned to water before being pumped by a cycle pump 9 and fed through a feed-water heater 10 before being returned to the furnace as feed-water at 11. The power plant typically incorporates an exhaust stack or chimney 13 receiving waste gases from the burnt coal in the furnace 1.

In most conventional Rankine cycle plants, the overall efficiency of the plant is improved by bleeding some steam from the turbine 4 at 5 and passing this into the feed-water heater 10. The energy within the bleed steam is used to preheat the feed-water pumped from the cycle pump 9 to the furnace 1, thus requiring less energy from the coal-fired burners 2 to heat the feed-water to high-pressure steam.

Figure 2:
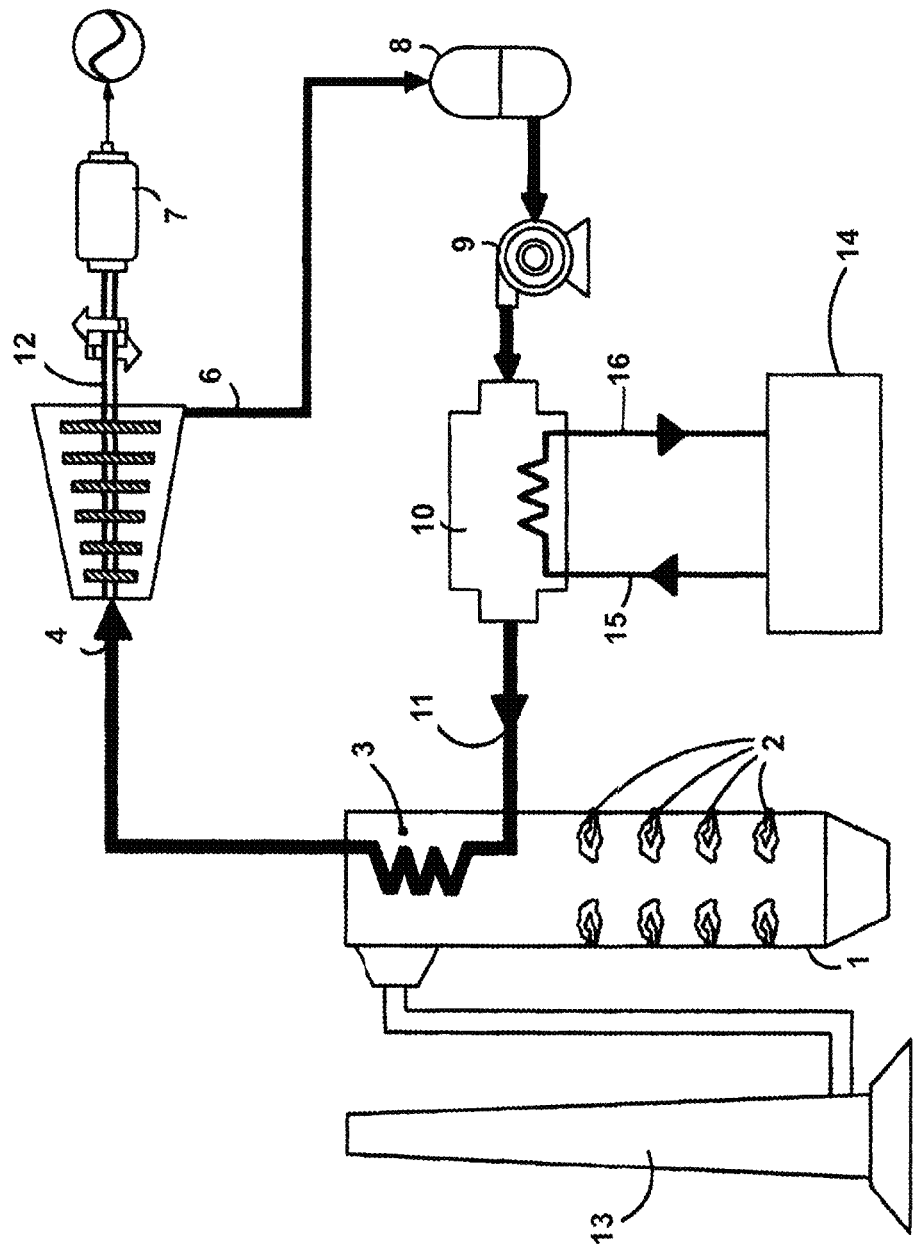
FIG. 2 is a similar view to FIG. 1 showing the use of a geothermal reservoir to heat feed-water.

In contrast to conventional steam cycles as shown in FIG. 1, in a geothermal assisted power plant as shown in FIG. 2, low grade geothermal heat from a geothermal reservoir 14 is used in place of steam normally extracted from the turbine 4 for feed-water preheating.

Geothermal energy is a renewable source of heat that originates from the thermal energy stored in reservoirs deep within the earth. Part of the geothermal heat is the result of the earth's formation, some 4.5 billion years ago, but most is due to radioactive decay of isotopes. Some geothermal reservoirs are of low-moderate temperature i.e. 20° C.-150° C. and are more suited for direct-use applications, whereas higher temperature geothermal reservoirs of approximately 150° C.-300° C. are preferred for indirect use such as electricity generation.

In a geothermal assisted power generation plant, geothermal water can be fed from the reservoir 14 through a bore or pipe 15 to the feed-water heater 10 where it is used to preheat the feed-water being fed to the furnace 1 before being returned to the geothermal reservoir 14 for reheating through a return bore or pipe 16.

In this manner, low grade geothermal heat from the reservoir 14 is used in place of steam normally extracted from the turbine 4 through bypass 5 for feed-water preheating as shown in FIG. 1. The otherwise extracted steam is therefore available to generate additional power in the turbine. This rather simple yet effective concept enables coal-fired power, stations to increase either their generating capacity by up to 20% with the same consumption of coal during periods of peak demand, or alternatively to provide the same generating capacity with reduced coal consumption. In both cases, the GHG emissions of the plant per unit of generating capacity are significantly reduced.

Figure 3:
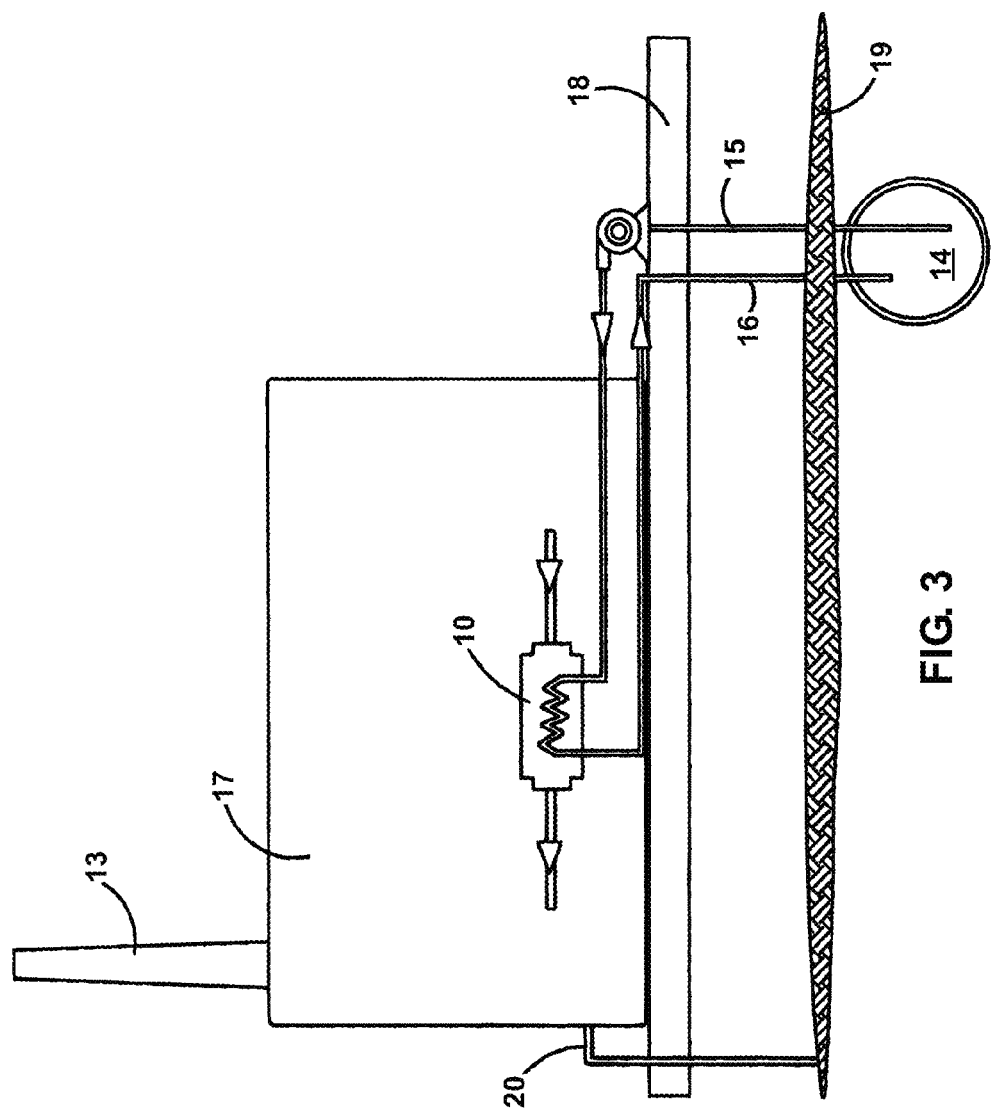
FIG. 3 is a schematic representation of a coal-fired power plant located above a coal-seam and a geothermal reservoir in accordance with the invention.

The present invention relates to a further benefit in using heat from a geothermal reservoir to preheat feed-water into a coal-fired furnace for power plants which are located in the vicinity of the coal seam with a geothermal reservoir located beneath that seam. Such situations are commonly found in a number of regions, and in particular in the Sydney basin in New South Wales, Australia where the major coal-fired power stations are all water cooled and located in the vicinity of coal seams. It has been found that in many of these locations there are geothermal reservoirs located beneath the coal seams as can be seen in FIG. 3 where a power plant 17 is shown diagrammatically located on a ground surface 18 above a coal seam 19. Coal is mined from the coal seam 19 in the normal manner and fed via various mechanisms which might include conveyor belts diagrammatically represented by feed line 20 into the power plant 17 where it is burnt in the coal-fired furnace as previously described.

The inventors of the present invention have realised that the geothermal reservoirs as shown at 14 located beneath one or more coal seams 19 typically have a higher temperature than similar geothermal reservoirs that are not beneath coal seams. The coal seam 19 acts as an insulating heat flow barrier, keeping the temperature of the geothermal reservoir 14 at a higher level than would be the case in the absence of the coal seam. The efficiency of coal-fired power plants can therefore be improved by locating geothermal reservoirs in the vicinity of the power plant and which are also located beneath the coal seams 19. Initial exploration has shown that there are many such locations in the Sydney basin and that the operating efficiency of such coal-fired power plants can be significantly improved by finding geothermal reservoirs 14 beneath the coal seams 19 and using geothermal water at elevated temperatures to be pumped via the bores and pipes 15 and 16 through the feed water heaters 10 in the power plants 17. Such location of the geothermal reservoirs further enhances the operating efficiency gains available from preheating feed water using geothermal reservoirs.

Figure 4:
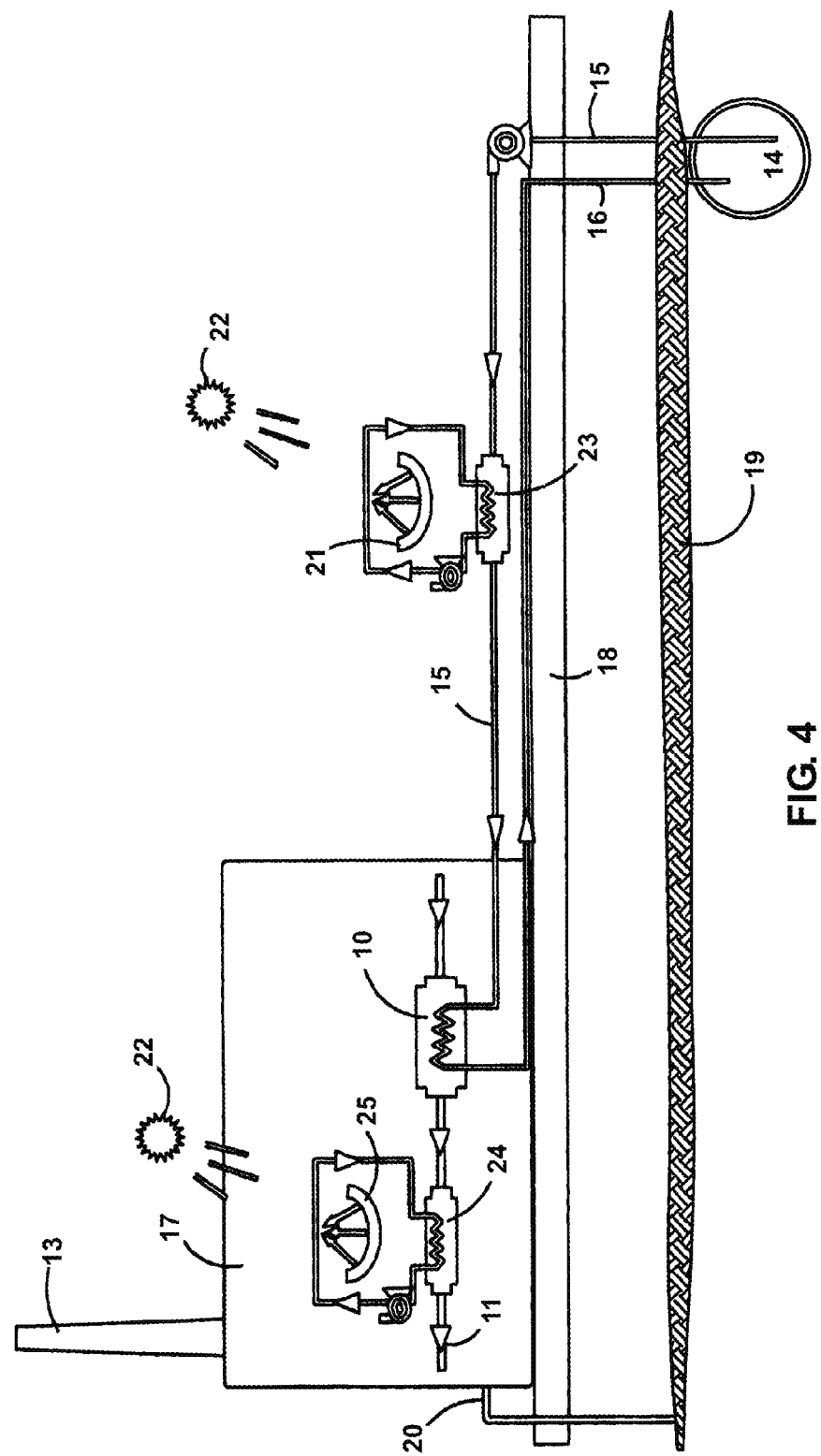
FIG. 4 is a similar view to FIG. 3 showing the optional use of solar collectors to boost the temperature of the geothermal hot water, and to compensate for heat losses in the geothermal pipeline.

Although the power plant shown in FIG. 3 is diagrammatically located directly above a coal seam 19 with the geothermal reservoir 14 located directly beneath the power plant, it will be appreciated that both some or all of the coal seam, and the geothermal reservoir may be located at some distance from the power plant as shown in FIG. 4 with appropriate supply lines 20 of coal to the power plant 17 and appropriate arrangement of the feed and return bores or pipes 15 and 16 in order to provide high temperature geothermal water from the reservoir 14 into the feed water heater 10.

In situations where the feed and return bores or pipes 15 and 16 are of considerable length, it is also proposed to compensate for heat losses in the feed pipe 15 by using solar energy from a solar collector 21 to utilise heat from the sun 22 through a heat exchanger 23 to further heat the geothermal water in the pipeline 15. In a similar manner, the temperature of the feed-water to the furnace 1 which is heated in the feed-water heater 10 as previously described can be further boosted by the use of an additional heat exchanger 24 using heat from a solar collector 25 located on or adjacent the power plant 17.

By using a combination of some or all of these heat sources i.e. the geothermal reservoir 14, the solar boosters 21 and 25, it is possible to provide significant heat gain to the feed-water being returned to the furnace at 11 and so provide significant improvements in the operating efficiency of a coal fired power plant.

The invention claimed is:

1. A geothermal assisted coal-fired power plant including a furnace arranged to heat feed-water into steam, a turbine driven by the steam and in turn driving an electrical generator, a condenser arranged to receive exhaust steam from the turbine, cooling and condensing it back to water, and a feed-water heater arranged to reheat water from the condenser before feeding it back to the furnace, wherein the power plant uses coal taken from one or more coal seams in the vicinity of the power plant, and the feed-water heater is provided with energy from a geothermal reservoir located beneath at least one of the coal seams.

2. A geothermal assisted power plant as claimed in claim 1 wherein the coal seam acts as an insulating heat flow barrier, keeping the temperature of the geothermal reservoir at a higher level than would be the case in the absence of the coal seam.

3. A geothermal assisted power plant as claimed in claim 1 wherein the energy from the geothermal reservoir is provided by pumping geothermally heated water from the reservoir, circulating this geothermal hot water through the feed-water heater, and then returning it to the geothermal reservoir for re-heating.

4. A geothermal assisted power plant as claimed in claim 3 wherein both the coal seam and the geothermal reservoir are located some distance from the power plant with the geothermal hot water re-circulated through insulated supply and return pipelines.

5. A geothermal assisted power plant as claimed in claim 4 wherein the temperature of the geothermal hot water in the supply pipeline is boosted by one or more solar collectors located along the supply pipeline.

6. A geothermal assisted power plant as claimed in claim 1 wherein the temperature of the feed-water is boosted by one or more solar collectors.

* * * * *